Feb. 1, 1955   J. E. COWLES   2,701,291
AUTOMATIC SOLDERING MACHINE
Original Filed May 12, 1949   5 Sheets-Sheet 1

INVENTOR.
John E. Cowles
BY Harry Langsam
Attorney

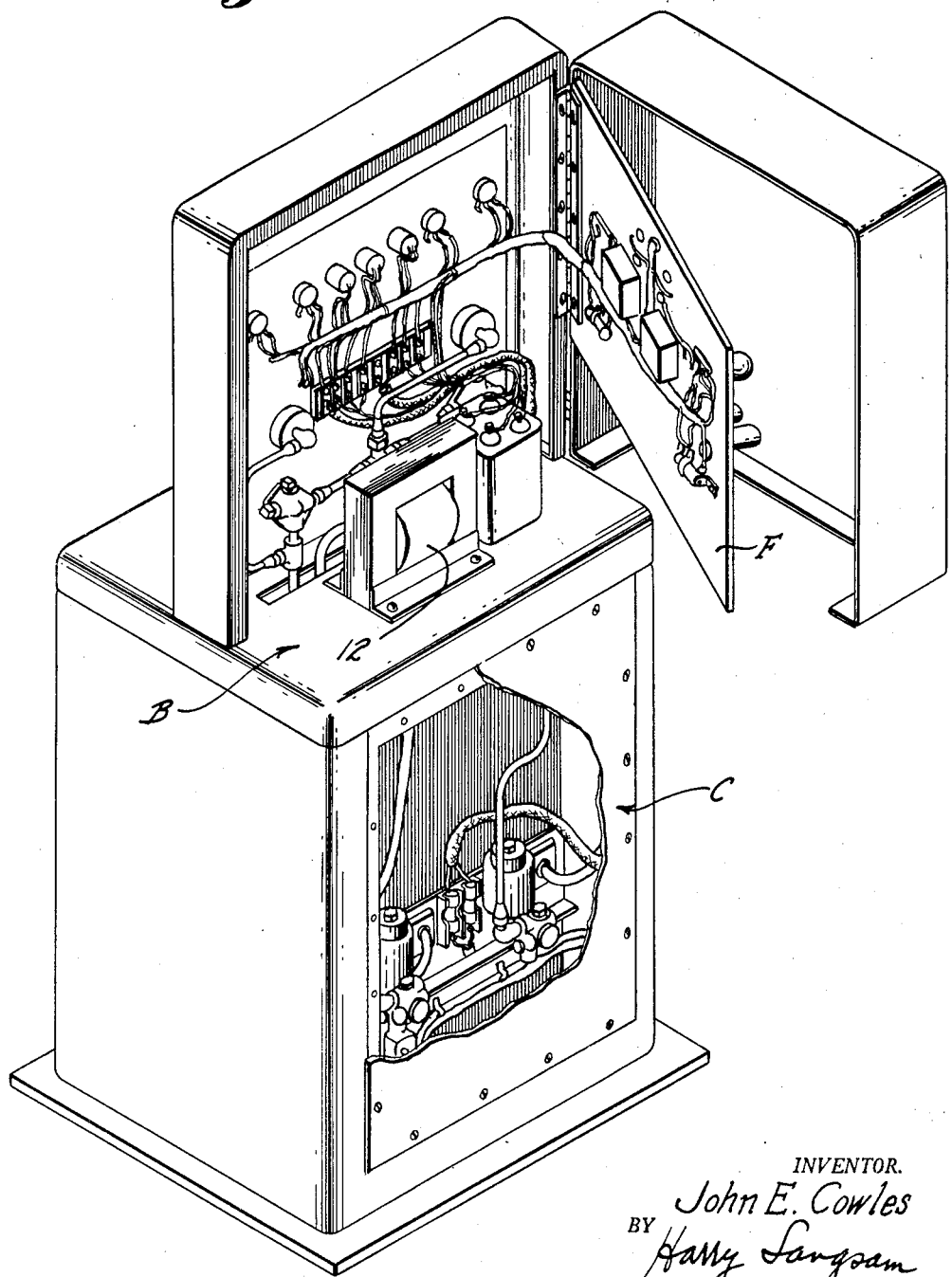

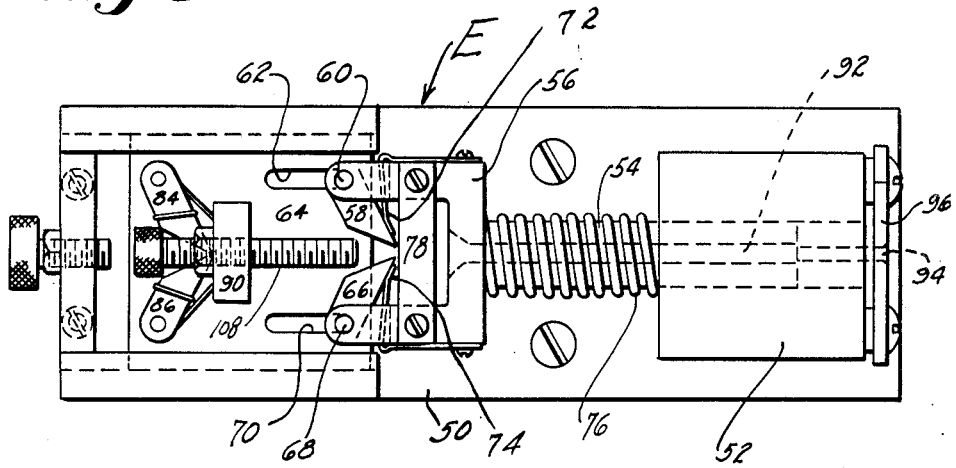
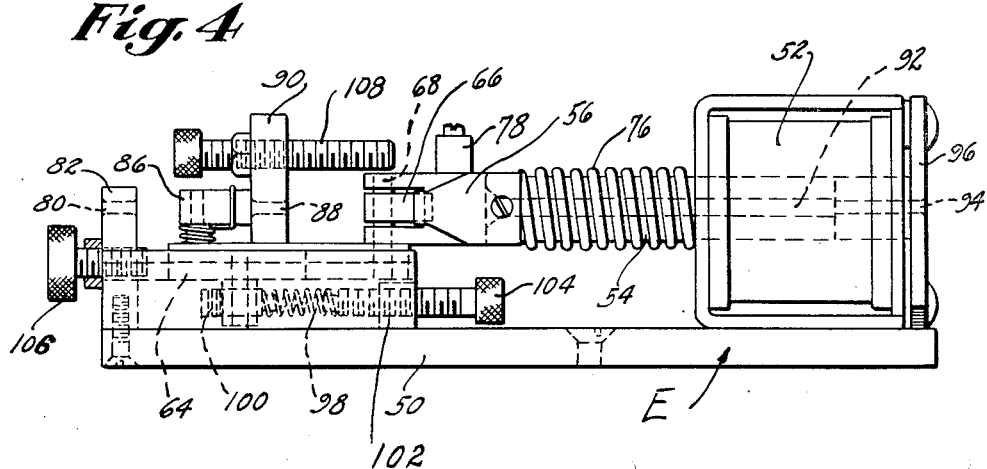

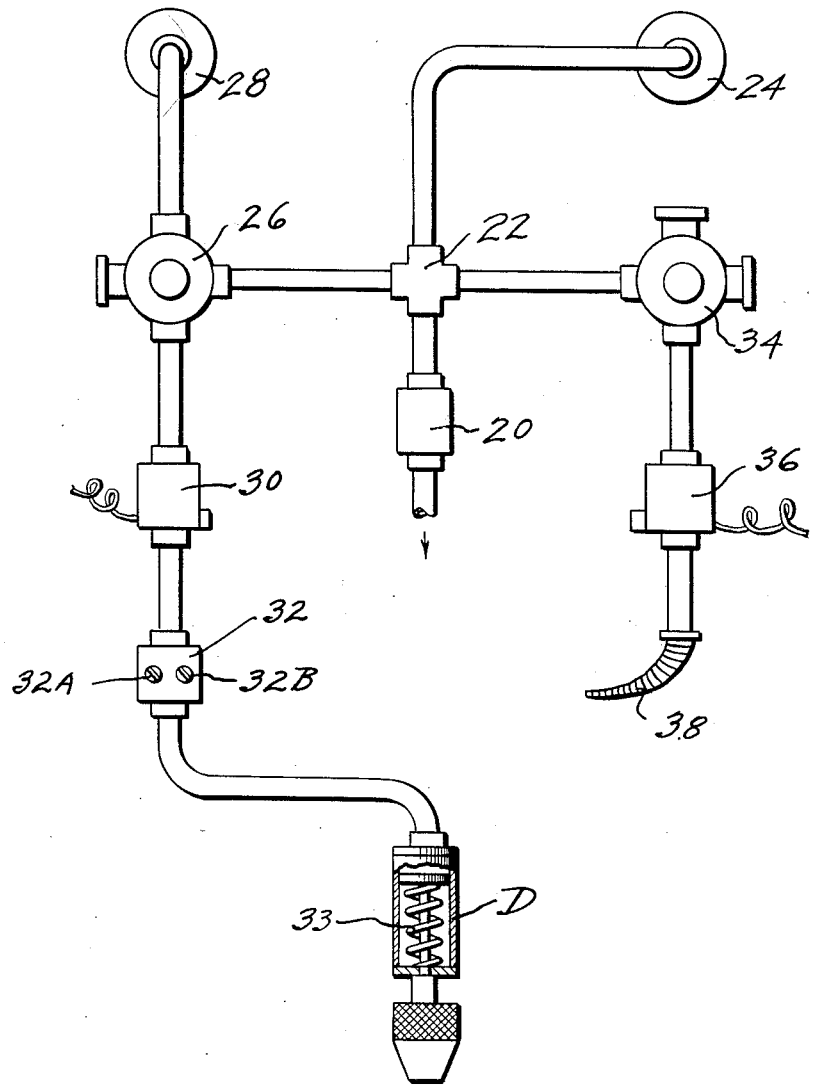

United States Patent Office 2,701,291
Patented Feb. 1, 1955

2,701,291

AUTOMATIC SOLDERING MACHINE

John E. Cowles, Philadelphia, Pa.

Original application May 12, 1949, Serial No. 92,907, now Patent No. 2,628,585, dated February 17, 1953. Divided and this application January 9, 1953, Serial No. 337,401

1 Claim. (Cl. 219—12)

My invention relates to automatic soldering machines, and relates particularly to a machine wherein the soldering heat is developed electrically.

It is an object of my invention to provide a semi-automatic machine for mass-producing any type of soldered connection for which the machine may be set up.

Another object of my invention is to provide a machine of the above description in which most of the various steps of the soldering operation are performed automatically, with automatic or manual control thereof.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing(s) in which:

Fig. 2 is a perspective view of the rear of my invention, the cabinet being opened to expose the power supply and controls thereof.

Fig. 3 is a top view of my solder advancing mechanism.

Fig. 4 is a side view of the solder advancing mechanism.

Fig. 5 is a schematic diagram of the pneumatic circuit used in my invention.

Briefly, my invention functions by holding the work between a fixed, high-resistance carbon electrode which is shaped to receive the work and a movable, low resistance clamping electrode, the latter being operated by compressed air. A stepdown transformer connected to the electrodes sends a heavy current of electricity through the electrodes and the work, and develops heat in the high resistance electrode, principally at the point of contact with the work. After the work has been brought to soldering heat, solder is applied and withdrawn and the transformer is then de-energized. The clamping electrode is then raised to allow the work to be changed. Electronic timing circuits control the sequence and duration of the various steps described.

Figure 1:
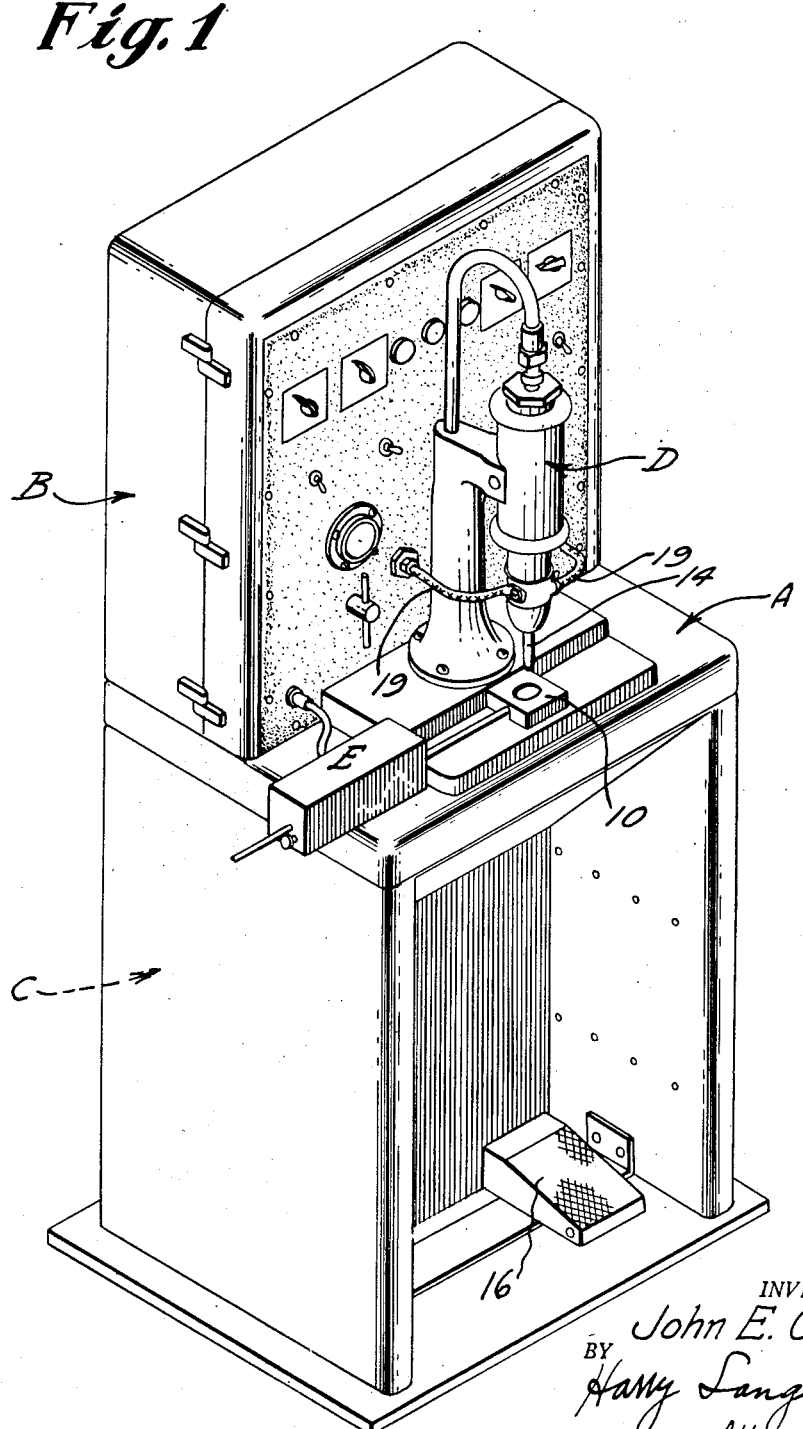
Fig. 1 is a perspective view of the front of a cabinet embodying my invention.

Referring now to the drawings, wherein similar reference characters designate similar parts, I show a soldering machine comprising a work bench position in the front designated generally as A, an upper cabinet B, and a lower cabinet C. The work bench A supports the work-receiving fixed electrode 10, the pneumatic cylinder, generally designated as D which actuates the movable electrode 14 and the solder feed, generally designated as E. The upper cabinet B houses the heating current transformer 12, the adjustable controls for timing the various operations, the indicator lamps, the air pressure gauges, and the operating switches and relays. These are illustrated pictorially in Figs. 1 and 2.

A separate hinged chassis, designated generally as F supports the electronic tubes and timing circuits.

The lower cabinet C houses the solenoid-operated air valves which actuate the pneumatic electrode D, and if desired, may house an electric motor-driven air-compressor (not shown).

The solder feed E, shown in Figs. 3 and 4, is a solenoid-actuated unit for intermittently advancing a length of wire solder against the heated work. The unit consists of a base plate 50 carrying at one end a solenoid 52, through the bore of which passes an armature shaft 54. The rear end of the armature shaft 54 terminates in a yoke 56. One side of the yoke carries a forwardly-extending jaw 58 pivoted upon a pin 60 which extends downwardly into a guide slot 62 in movable plate 64. Similarly, the other side of the yoke carries a jaw 66 which pivots upon a pin 68, the pin extending within a guide slot 70 in plate 64. The jaws 58 and 66 are urged together by pressure springs 72 and 74 respectively which are attached to the yoke sides. An armature return spring 76 encircles the shaft 54, and a bridge 78 is attached to the top of the yoke.

The wire solder is supplied from a reel (not shown) and the free end passes through an aperture 80 in a post 82 at the rear end of the plate 64. The solder then passes between a pair of forwardly-extending spring-loaded jaws 84 and 86, through an aperture 88 in the stop-screw post 90, through the yoke jaws 58 and 66, then through an axial passage 92 in the armature 54 and finally through an aperture 94 in a plate 96 attached to the forward end of the solenoid 52. The stop screw post 90 is mounted upon the slidable plate 64.

A compression spring 98 extends between a lug 100 on the underside of plate 64 and the base post 102, the latter carrying a thumbscrew 104 for adjusting the compression of the spring 98. A thumbscrew 106 in post 82 serves as a back stop adjustment for the plate 64.

The feed unit functions as follows. At the proper point in the soldering cycle, the solenoid 52 is energized, drawing the armature 54 forward. The yoke jaws 58 and 66 seize the solder and draw it forward compressing the armature spring 76. When the pins 60 and 68 strike the forward ends of their guide slots, the movable plate 64 is also moved forward, compressing spring 98. The rear jaws 84 and 86 permit the wire to move between them in a forward direction. Meantime the work has been placed upon the fixed carbon block 10 by the operator, and the pneumatically operated movable electrode 14 descends, clamping the work against the carbon block 10. The current transformer 12 is energized heating the work. At this time the solder is fed against the heated juncture. When the solenoid 52 is de-energized, the armature 54 and the movable plate 64 retract, withdrawing the solder from the work. The plate 64 is stopped first by the rear stop screw 108. As the yoke jaws continue to move back, they allow an additional length of solder to pass through, before the bridge 78 strikes the adjustment stop screw 108 in post 90. The solder feed thus automatically feeds a measured length of solder to the work, and subsequently withdraws the solder slightly, to prevent an excess from being melted off.

The pneumatic circuit shown in Fig. 5, consists of the following elements. Compressed air (which may be furnished by a small compressor not shown) passes through a filter 20 into a cross connection 22 at which point a gauge 24 shows the line pressure. The air then passes into an expansion valve 26 which reduces the pressure, as measured by gauge 28, to the necessary valve for operating the pneumatic cylinder D. The air then passes through a solenoid valve 30 which is opened at the proper time by the electronic heating timer described later, through the cylinder speed control 32 into the pneumatic cylinder D, forcing the upper electrode 14 into contact with the work for a pre-determined interval of time. The solenoid valve 30 then closes, shutting off the air supply from the expansion valve 26 and releasing through its exhaust port the air trapped in the cylinder D. An internal spring 33 raises the electrode 14 from the work. The cylinder speed control varies the time required for the electrode 14 to operate and may be set by the operator of the machine.

Air is also used to cool the work after the electrode 14 is raised. This air is conducted from the cross fitting 22 to a second expansion valve 34, thence through a second solenoid valve 36 to a flexible Venturi tube 38 which is aimed at the soldered juncture in the work. The solenoid valves 36 and 30 operate alternately, so that the cooling air is blown upon the work as soon as the cylinder D releases it. In certain instances, this cooling air may also be used to blow the soldered work off the carbon block 10, into a receptacle for finished work, reducing the machine operator's task to that of inserting the new work only.

The electrical controls now to be described have various functions, depending upon the mode in which the machine is to be used.

In the manual mode of operation, the length of time of heating cylinder air pressure and solder feed are still determined automatically, but they are initiated by the operator, using the foot pedal 16. Manual operation is useful for small lots of work and for familiarizing the operator with the machine.

Figure 6:
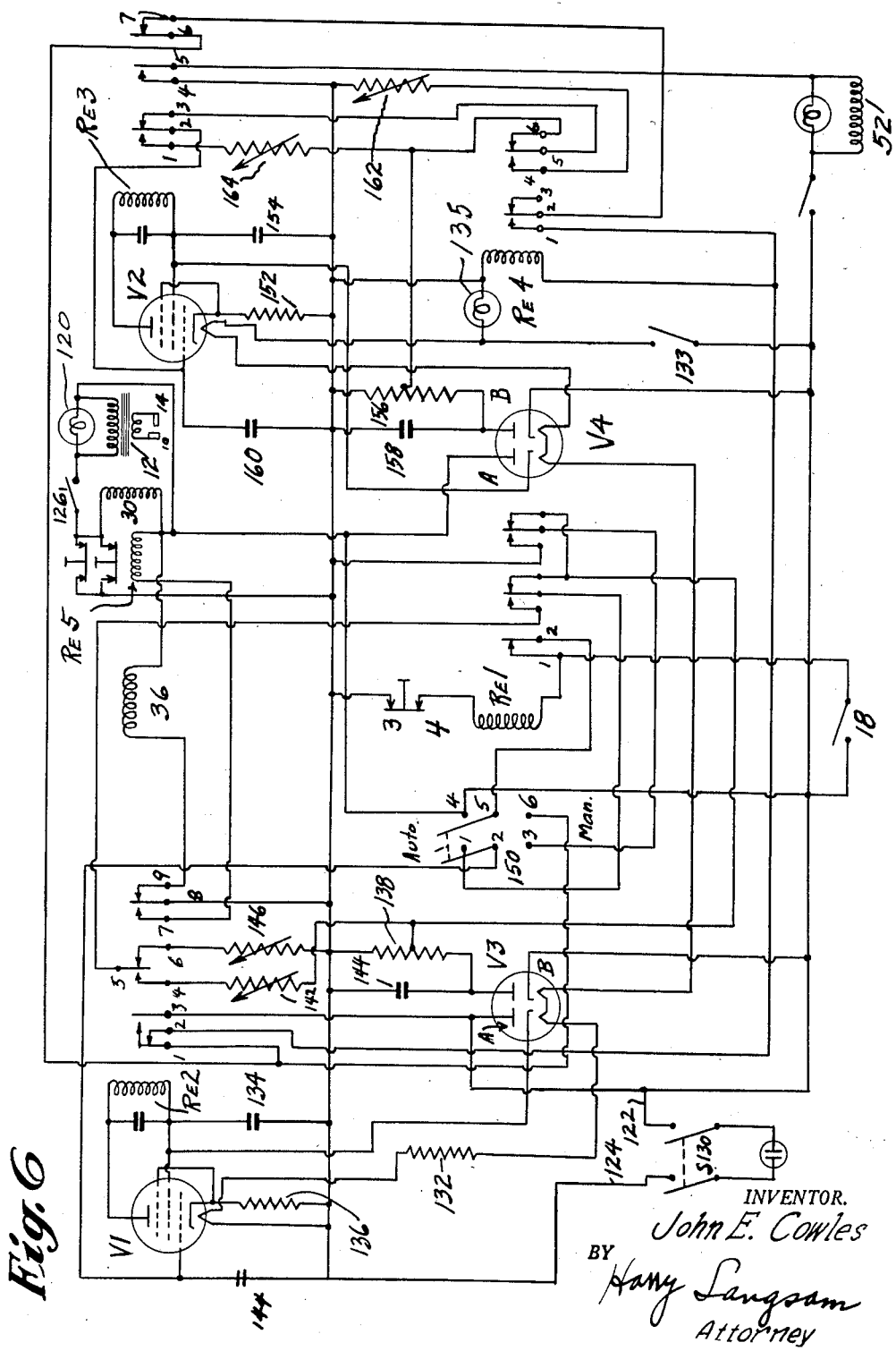
Figure 6 is a schematic diagram of the electrical wiring of my invention.

In the automatic mode, the operator manually inserts the work upon the fixed electrode 10 and then starts the machine the first time by pressing the foot pedal 16. The machine then automatically clamps the work, passes a heavy current of electricity to heat the point to be soldered, feeds a measured length of solder into this heated point, and then cools the work. The operator then continues to supply new work to the machine. One timer cyclically controls the heating time, the air cooling time and the pneumatic cylinder operation. A second timer controls the solder feed operation, synchronizing it at the proper delay interval with the heating operation. The wiring diagram of the machine is shown in Fig. 6. Five multi-contact relays are used to connect the various circuits for either manual or automatic operation, as selected by DPDT switch 150. Relay No. 1 controls the heating timer tube V1. Relay No. 2 is operated by V1, and in turn alternately energizes the air cooling solenoid valve 36 and through relay No. 5, the cylinder air valve solenoid 30 and the current transformer 12. Relay No. 4 controls the solder feed timer tube V2, which energizes relay No. 4. The latter relay energizes the solder feed solenoid 52. Each timer tube has its own rectifier tube, which supplies the plate, screen and grid biasing voltages required. Each timer tube has its control grid shunted by a capacitor which operates in combination with adjustable charging or discharging resistors to vary the grid bias over a predetermined interval so as to render the tube more or less conductive for that interval. A. C. power is supplied from the mains through the switch 130 to the high side 122 and the low side 124. The electrodes 10 and 14 connect to the low voltage secondary winding of the current transformer 12. The primary winding of this transformer is bridged by a pilot lamp 120, and has one side connected to the high side 122 of the line, and its other side connected to the low side 124 of the line through pole A of relay No. 5 and a manual switch 126. The cylinder air solenoid valve 30 is connected to the high side 122 of the A. C. line, and to the low side 124 of the A. C. line through pole B of relay No. 5.

The heaters of the heating timer pentode V1, its power supply rectifier V3, the solenoid feed timer pentode V2 and its power supply rectifier V4, are wired in series with a line voltage dropping resistor 132, and Timer On-Off switch 133. A pilot lamp 135 indicates that the timers are operating. Diode A of V3 supplies D. C. positive voltage for the plate and screen of V1, the latter being shunted by a filter capacitor 134. The heating timer V1 is cathode biased by resistor 136, and its plate current energizes relay No. 2. Diode B furnishes a negative voltage to a potentiometer 138 shunted by a filter capacitor 144, the output voltage being used to bias the grid of V1 to cut-off, through an adjustable high-resistance control 142. This control 142 in combination with capacitor 144, determines the length of time that relay No. 2 is energized, and since relay No. 2 when energized operates relay No. 5 thru contacts 7–8, the time interval for clamping and heating the work is thereby determined for automatic operation. At the end of this time interval, the control grid of V1 becomes sufficiently negative to cut off plate current, relay No. 2 deenergizes, and the grid bias is discharged through adjustable discharging resistor 146. Simultaneously, relay No. 5 is deenergized, cutting off the cylinder air pressure and the heating current and the cooling air valve solenoid 36 is energized instead. When the control grid bias has been sufficiently dissipated through resistor 146, V1 again conducts, relay No. 2 again operates, and the clamping and heating portion of the cycle repeats. This alternate conduction and non-conduction of V1 constitutes the method by which automatic timing is achieved, and a full description of automatic operation will now be given. V2, it should be noted, functions in exactly the same manner as V1, except that it is synchronized therewith and controls the solder feed solenoid 52. DPDT switch 150 is thrown to automatic position and foot pedal switch 18 is operated. The field of relay No. 1 is thereby connected to line side 122 through switch 18, energizing the field. Contacts 1 and 2 of relay No. 1, in series with contacts 4 and 5 of switch 150 now shunt switch 18, and keep the field energized even after switch 18 is released. The control grid of V1 is now connected, through contacts 1–2 of switch 150, and contacts 3–4 of relay No. 1, and contacts 5–6 of relay No. 2 to the discharging resistor 146. The grid having zero bias, V1 conducts, and relay No. 2 becomes energized. Contacts 7–8 of relay No. 2 complete the A. C. circuit to relay No. 5, which in turn completes the A. C. circuits of the heating transformer primary and the cylinder air valve solenoid 30. Contacts 4–5 of relay No. 2 connect the control grid of V1 to the bias charging resistor 142, whose value determine the length of time before V1 again cuts off. As contact 3 of relay No. 2 moves to the left, it touches contact 1 which is already touching contact 2. The high side of the line is thereby momentarily connected to the field coil of relay No. 4, through contacts 2–3 of relay No. 2, energizing relay No. 4. As contact 3 of relay No. 2 continues to move left, it forces contact 1 away from contact 2, and holding current is supplied to relay No. 4 through contacts 1–3 of relay No. 2, contacts 6–7 of relay No. 3 (de-energized) and contacts 1–2 of relay No. 4 (energized). The solenoid feed timer tube V2 is cathode biased by resistor 152, and its plate current operates relay No. 3. Plate and screen voltage is furnished by diode a of rectifier tube V4, and is filtered by capacitor 154. Diode B of V4 furnishes negative grid-bias voltage to a potentiometer 156, which is filtered by capacitor 158. The control grid of V2 is shunted by capacitor 160 which is part of the timing network.

When relay 4 becomes energized, the control grid of V2 is connected to a grounded discharging resistor 162 through contacts 2–3 of relay No. 3 (de-energized) and contacts 4–5 of relay No. 4. As soon as the bias on the control grid of V2 has been dissipated through resistor 162, V2 conducts, and energizes relay No. 3.

Contacts 4 and 5 of relay No. 3 complete the A. C. circuit of the solder-feed solenoid 52. Contacts 1 and 2 of relay No. 3 connect the control grid of V2 to a source of cut-off bias through an adjustable charging resistor 164. This resistor determines the length of time for which V2 conducts plate current; and consequently, the time for which relay No. 3 remains energized. Contacts 6–7 of relay No. 3 open, de-energizing relay No. 5. As soon as the control grid of V2 becomes sufficiently negative through resistor 164, V2 cuts off and relay No. 3 is de-energized. The solder-feed solenoid current is interrupted at contacts 3–4 of relay No. 3, and the control grid of V2 is connected to a source of cut-off bias through contacts 2–3 of relay No. 3, and contacts 5–6 of relay No. 4. Accordingly, V2 will not conduct again until relay No. 4 is energized by relay No. 2, as described previously. The function of the discharging resistor 162, acting in combination with grid capacitor 160, is to delay the operation of the solder-feed solenoid until the work has become sufficiently heated to melt the solder.

The entire cycle of automatic operation has now been described in detail. In summary, the cycle is initiated by momentarily closing foot pedal switch 18, which causes the heating timer to operate cyclically. The heating timer in turn operates the solder-feed timer, and a delay circuit in the solder-feed timer causes it to feed at the proper time in each cycle.

On manual operation, switch 150 is thrown to manual position (down). After the operator has positioned the work upon the fixed electrode 10, he depresses the foot pedal switch 18. This completes the A. C. circuit to the field of relay No. 1, which when energized closes the following circuits.

Contacts 1–2 of relay No. 1 energize relay No. 4 through switch 18, contacts 5–6 of switch 150 and contacts 1–2 of relay No. 2 (de-energized). Contacts of relay No. 1 ground the grid of tube V1 through contacts 2–3 of switch 150, causing the tube V1 to conduct, and thereby energizing relay No. 2. Thus, the cylinder air valve solenoid 30 and the heating transformer 12 are operative as long as the foot pedal is held down. Relay No. 4 operates in the manner described for automatic operation, causing the solder-feed timer tube V2 to operate and feed solder to the work. Since relay No. 4 is actuated thru relay No. 2, solder is fed to the work each time the foot pedal 16 is depressed, after the delay interval determined by the setting of resistor 162.

In order to properly heat the work, I make the lower, shaped electrode 10 preferably out of high-resistance carbon, to develop heat. The upper, movable electrode 14 is made of low-resistance carbon. It is necessary to use carbon to prevent the work from sticking to the electrode. The flux used in the soldering operation may be incorporated in the solder itself. The movable electrode 14 is connected to the current transformer by a pair of heavy flexible cables 19 made of stranded copper wire. It is possible to use this machine for light duty resistance welding although the carbon electrodes would then be replaced with copper electrodes.

Although my invention has been described in considerable detail, such description is intended as being illustrative rather than limiting since the invention may be variously embodied and the scope of the invention is to be determined as claimed.

I claim as my invention:

An automatic soldering machine comprising an automatic clamp for the work, passing a heavy current of electricity through the work to be soldered, feeding a measured length of solder to the heated point, means to cool the work, a timer to control the heating time, a second timer to control the solder feed operation, a plurality of relays, one relay controlling the heating timer tube, a secondary relay to control air cooling solenoid valve, a third relay to energize the air cooling solenoid valve, and a fourth relay to control the solder feed.

References Cited in the file of this patent
UNITED STATES PATENTS

| | | |
|---|---|---|
| 1,732,523 | Mayo | Oct. 22, 1929 |
| 1,749,719 | Reiter et al. | Mar. 4, 1930 |
| 2,283,158 | Humphrey | May 12, 1942 |
| 2,321,368 | Dodkin et al. | June 8, 1943 |